United States Patent
Lai et al.

(10) Patent No.: US 6,307,163 B1
(45) Date of Patent: Oct. 23, 2001

(54) CHEMICAL MIXER TANK CALIBRATOR AND CALIBRATING METHOD FOR THE SAME

(75) Inventors: Chien-Hsin Lai, Kaohsiung Hsien; Fu-Yang Yu, Hsinchu, both of (TW)

(73) Assignee: United Microelectronics Corp. (TW)

( * ) Notice: Subject to any disclaimer, the term of this patent is extended or adjusted under 35 U.S.C. 154(b) by 0 days.

(21) Appl. No.: 09/285,923

(22) Filed: Apr. 2, 1999

(51) Int. Cl.[7] .............................. G01G 13/02; G01G 23/01
(52) U.S. Cl. .............................. 177/116; 177/45; 177/146; 73/1.13
(58) Field of Search .......................... 73/1.13; 702/101, 702/102; 141/83; 222/55, 56, 77; 177/1, 45, 46, 47, 48, 49, 116, 50, 60, 146, 147

(56) References Cited

U.S. PATENT DOCUMENTS

| | | | |
|---|---|---|---|
| Re. 32,058 | * 12/1985 | Brunnschweiler et al. | 177/1 |
| 3,557,890 | * 1/1971 | Lilljeforss et al. | 177/1 |
| 3,685,602 | * 8/1972 | Mayer | 177/70 |
| 4,462,474 | * 7/1984 | Bordeaux et al. | 177/48 |
| 4,522,276 | * 6/1985 | Fogg et al. | 177/145 |
| 4,549,620 | * 10/1985 | Dee et al. | 177/60 |
| 4,583,605 | * 4/1986 | Hirano | 177/60 |
| 5,056,272 | * 10/1991 | Battaglia | 51/283 R |
| 5,156,194 | * 10/1992 | Von Nehring et al. | 141/83 |
| 5,346,203 | * 9/1994 | Stemmle | 271/288 |
| 5,835,982 | * 11/1998 | Lanaro et al. | 177/146 |
| 5,913,344 | * 6/1999 | Wronski et al. | 141/83 |
| 6,080,938 | * 6/2000 | Lutz | 73/1.13 |

* cited by examiner

Primary Examiner—Randy W. Gibson
(74) Attorney, Agent, or Firm—Martine & Penilla, LLP

(57) ABSTRACT

A chemical mixer tank calibrator and a calibrating method for the same. The chemical mixer tank calibrator calibrates the weight of the mixer tank through a step motor. Once the chemical in the mixer tank is used up, the mixer tank can be automatically filled with chemical. Thus, the chemical in the mixer tank can adequately supply the buffer tank and the machine at any given time.

7 Claims, 2 Drawing Sheets

CHEMICAL MIXER TANK CALIBRATOR AND CALIBRATING METHOD FOR THE SAME

BACKGROUND OF THE INVENTION

1. Field of Invention

The present invention relates to a chemical supplying device. More particularly, the present invention relates to a device that automatically renews a chemical and a method for the same.

2. Description of Related Art

Different chemicals in the industry are often used to achieve different industrial objectives. To accommodate different processes and equipment in a factory, all types of automatic chemical supplying devices have been developed to meet the demands for low cost and high throughput.

Conventionally, in the process for preparing chemicals for use in a process, a chemical of appropriate concentration can be prepared in a mixer tank. The chemical prepared in the mixer tank is conveyed to a buffer tank. The chemical in the buffer tank is then supplied to the required machine by pipes.

To achieve the objective of automatic control, a scale is installed below the mixer tank. The scale measures the net weight of the mixer tank and the chemical therein. When a reading obtained by the scale is equal to the net weight of the mixer tank, it means that the chemical in the mixer tank is used up. Here, the mixer tank is automatically supplied with chemical to ensure that the mixer tank contains enough chemicals to adequately supply the buffer tank.

However, a layer of chemical residue may remain on the wall and bottom of the mixer tank after the mixer tank has been used for a long time. In addition, an exhaust for ventilation affects the weight measurement accuracy of the mixer tank. So, even if the chemical in the mixer tank is used up, the reading measured by the scale is still larger than the net weight of the mixer tank. Thus, the mixer tank is not automatically renewed with the chemical. When the buffer tank needs more of the chemical, a control signal is sent to activate a mixer pump, which conveys the chemical from the mixer tank to the buffer tank. Since there is no chemical left in the mixer tank, the mixer tank pump idles. As a result, the process comes to a standstill.

SUMMARY OF THE INVENTION

The present invention is to provide a chemical mixer tank calibrator and a calibrating method for the same. The calibrator and the calibrating method are appropriate to be used in a chemical supplying device. The chemical supplying device includes a mixer tank, which is used to prepare the chemical. The mixer tank is connected to a buffer tank through a pipe, which has a mixer tank pump thereon. There is a scale below the mixer tank to measure the net weight of the mixer tank and the chemical within. A low level sensor and a high level sensor are mounted respectively at a low level and a high level in the buffer tank. The low level is a point near the bottom of the buffer tank and the high level is a point near the top of the buffer tank. The mixer tank is connected to the chemical mixer tank calibrator. The chemical mixer tank calibrator includes a step motor for supporting the mixer tank, a driver for driving the step motor, and a controller for controlling the driver. The calibrating method of the chemical mixer tank includes setting a reference value Y equal zero. A surface level of a chemical in the buffer tank is checked. When the surface level of the chemical is lower than the low level, the reference is kept reset. In contrast, when the surface level is higher than the low level, a mixer tank pump is activated to draw the chemical from the mixer tank. After the mixer tank pump has been activated for 1 to 5 min, the mixer tank pump is stopped if the surface has reached the high level. Otherwise, buffer tank reaches the high level. However, it will continue with the next step if the liquid in the buffer tank does not reach the high level. The step motor is activated to lift the mixer tank upwards, so that the weight of the mixer tank measured by the scale is reduced and 1 is added to a Y value, which is the number of counts for iterating the activating steps. If X value which is the Y value added with 1 each time the activating step is cycled through is less than 5, the steps of activating the mixer tank pump are repeated, otherwise an initialization step is performed to the step motor followed by triggering the alarm.

Accordingly, the chemical mixer tank calibrator is used in the invention to calibrate the mixer tank and the scale, so that the chemical is automatically supplied to the mixer tank. This prevents the weak point of idling when the mixer tank pump tries to draw the chemical from the mixer tank to the buffer tank when there is no chemical left in the mixer tank.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
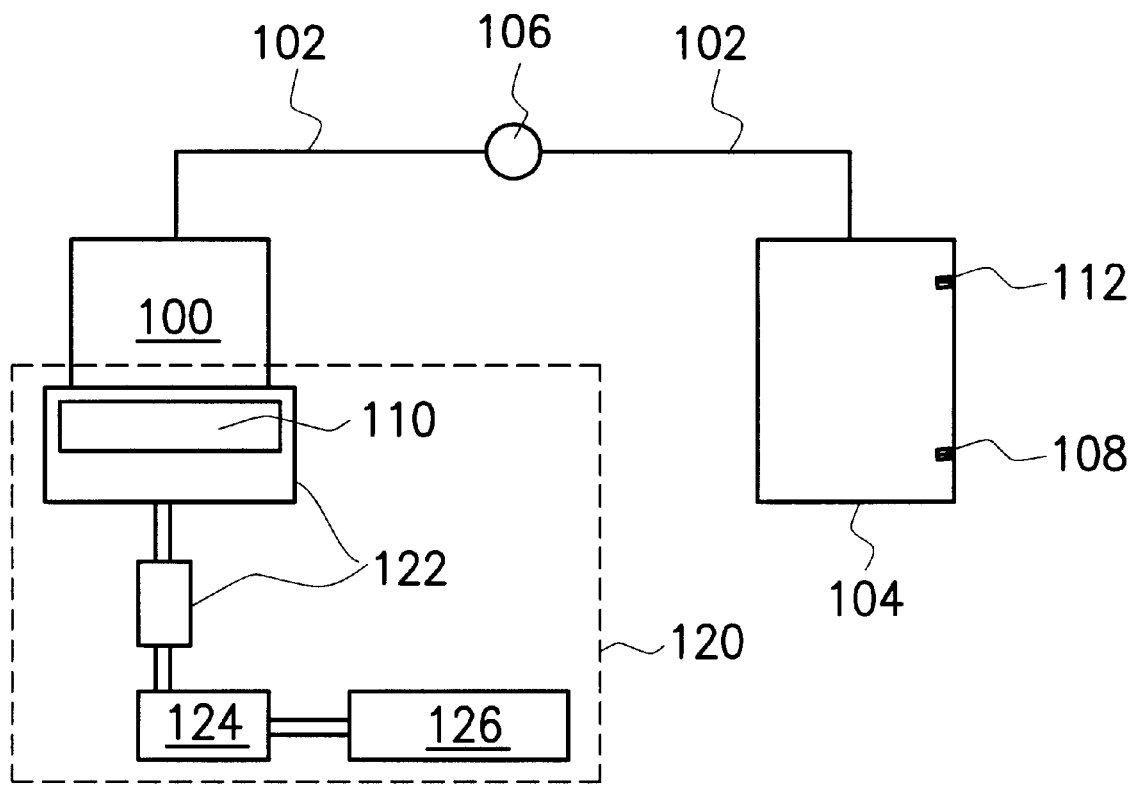
FIG. 1 is a schematic diagram showing the chemical supply according to the preferred embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, a chemical supplying device comprising a mixer tank 100 for preparing a chemical is shown. The mixer tank 100 is connected to a buffer tank 104 through a pipe 102. A mixer tank pump 106 is fitted on the pipe 102. A low level sensor 108 and a high level sensor 112 are mounted respectively at a low level and a high level in the buffer tank 104, where the low level is near to the bottom and the high level near to the top of the buffer tank 104. The mixer tank 100 is loaded on a scale 110, which is connected to a chemical mixer tank calibrator 120. The chemical mixer tank calibrator 120 has three parts. They are a step motor 122 for supporting the mixer tank 100 a driver 124 for driving the step motor 122, and a controller 126 for controlling the driver 124, respectively.

Figure 2:
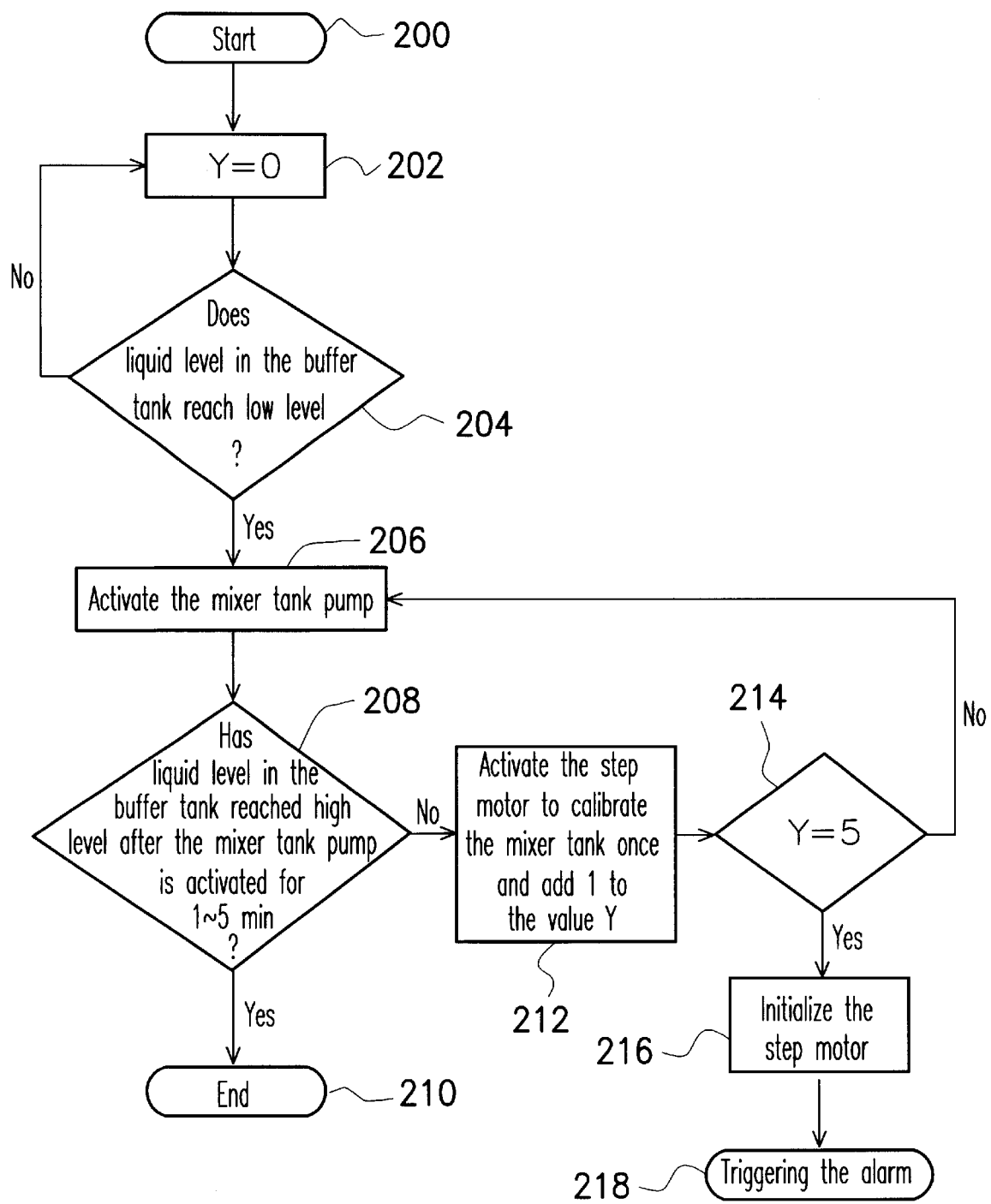
FIG. 2 is a flow chart showing the chemical supply according to the preferred embodiment of the invention.

Referring to FIG. 1 and FIG. 2, the process flow of the chemical supply begins at step 200. Before the start of the process flow, the chemical in the buffer tank 104 is assumed to be at a level between the low level and the high level of the buffer tank 104. As the process starts at step 200 the chemical in the mixer tank 100 is continually supplied to the buffer tank 104. An initial value of a reference value Y is given as 0 in step 202. The reference value indicates a number of counts for iterating the activating loop comprising steps 206. 208, 212, and 214.

Whether the liquid level of the chemical reaches or exceed the low level, or the liquid level is under the low level is detected by the low level sensor 108 in the step 204. If the liquid level does not lower down to the level where the low level sensor 108 is located in the buffer tank 104, the step 202 is executed again. In contrast, while the liquid level in the buffer tank 104 is lower than the low level, i.e. the liquid level no longer covers the low level sensor 108, the step 206 is performed.

The mixer tank pump 106 is activated in step 206 to convey the chemical from the mixer tank 100 to the buffer tank 104.

Typically, after the mixer pump 106 has been activated for about 1–5 minutes in step 208, the process of the chemical supply would terminate in step 210, provided that the chemical level in the buffer tank 104 reaches the high level. That means the liquid level is sensed by the high level sensor 112. If the liquid level still cannot reach the high level sensor 112 after the mixer tank pump 106 has been activated for 1–5 minutes, it indicates that the chemical in the mixer tank 100 is used up.

The chemical supply of the mixer tank 100 is automatically controlled and the scale 110 below the mixer tank 100 measures the net weight of the mixer tank 100 and the chemical within. A weight reading obtained by the scale 110 that is approximately equal to the weight of the empty mixer tank 100 means that the chemical in the mixer tank 100 is used up. Here, the preparation function of the mixer tank 100 is activated to ensure that the buffer tank 104 is adequately supplied with the chemical in the mixer tank 100. However, after the mixer tank 100 has been used for a long time, a layer of chemical residue may remain on the wall and bottom of the mixer tank 104. In addition, the exhaust for ventilation affects the accuracy in the weight measurement, so that the reading measured by the scale 110 is usually larger than the weight of the empty mixer tank. Thus, the chemical preparation function of the mixer tank 100 cannot be activated automatically.

A calibrating step 212, which calibrates the mixer tank 100 with the step motor 122, is performed. In the invention, "1" is added to the reference value Y in step 212 for each cycle until the reference value Y reaches "5". Meanwhile, the mixer tank 100 is calibrated using the chemical mixer tank calibrator 120. A part of the weight of the mixer tank 100 is supported using a step motor 122 in the chemical mixer tank calibrator 120. For example the step motor 122 is connected to the mixer tank 100 through the supporting frame at the bottom edge of the mixer tank 100. The step motor 122 is activated by controlling the driver 124 with the controller 126 and by driving the step motor 122 with the driver 124. After the step motor 122 is driven, the mixer tank 100 is lifted up from its surrounding to reduce the net weight of the mixer tank and the chemical within. The level of the mixer tank lifted by the step motor depends on the preset value Y according to experience, where a higher preset value usually corresponds to a lower lifting level and vice versa.

If the weight measured by the scale 110 after calibration is approximately equal to the weight of the empty mixer tank, the chemical preparation function is automatically activated to supply the chemical to the mixer tank 100.

After the step motor 122 performs a calibration to the mixer tank 100, step 214 is performed. The Y value, which is the number of counts for iterating the activating loop, is determined in step 214 to see whether it is equal to a specific value, in this case, 5. If the Y value is less than 5, the process returns to step 206. The reason for setting an upper limit of the reference value Y to 5 is that the cycle of the preset steps 206, 208, 212, and 214 is executed no more than five times. If the reading measured by the scale 110 is still larger than the weight of the empty mixer tank 100 after five repetitions of step 212 or five calibrations to the mixer tank 100, that indicates other reasons have caused chemical to not supply to the mixer tank 100. Thus, step 216, which initialize the step motor 122 is performed.

An initialization step 216 is performed to return the step motor 122 to the initial condition. This is followed by step 218, which triggers the alarm indicating the occurrence of an unpredictable situation which must be handled on the spot by workers skilled in the art.

It is understood from the preferred embodiment above that the chemical mixer tank calibrator calibrates the mixer tank and the scale. If there is residue on the wall and bottom of the mixer tank or other external factors when the chemical in the mixer tank is used up, the reading obtained by the weight measurement is still approximately equal to the weight of the empty mixer tank after calibration. After that, the chemical can be automatically supplied to the mixer tank. This prevents the weak point of idling when the mixer tank pump tries to draw chemical from the mixer tank to the buffer tank but fails because there is no chemical left in the mixer tank.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for calibrating a chemical mixer tank used in a chemical supplying device, wherein the chemical mixer tank is connected to a buffer tank through a conveying pipe, the method comprising:

a) setting an initial reference of a reference value Y to zero;

b) activating a mixer tank pump to convey chemical from the mixer tank to the buffer tank when a liquid level is lower than a first level of the buffer tank, otherwise, iterating steps a) and b);

c) activating the mixer tank pump for about 1 minute to about 5 minutes;

d) stopping calibrating when the liquid level reaches a second level, wherein the second level is higher than the first level, otherwise, proceeding to a next step e);

e) initiating a step motor for performing a weight calibration on the chemical mixer tank by lifting the mixer tank upward so as to reduce a reading from a weight measurement, and adding one to the reference value Y;

f) repeating steps c) to e) until Y reaches five;

g) initializing the step motor; and h) triggering the alarm.

2. The method of claim 1, wherein the first level is between a middle level and a bottom of the buffer tank.

3. The method of claim 1, wherein the second level is between a middle level and a top of the buffer tank.

4. The method of claim 1, wherein the weight measurement is performed with a scale.

5. The method of claim 1, wherein the step motor is driven by a step motor driver.

6. The method of claim 1, wherein the driver is controlled by a controller.

7. The method of claim 1, when the reference value Y reaches 4, the weight measured by a scale is allowed to be smaller or equal to the weight of the empty mixer tank after five calibrations under normal conditions.

* * * * *